United States Patent [19]
Berg

[11] Patent Number: 4,806,319

[45] Date of Patent: Feb. 21, 1989

[54] REDUCTION OF SULFUR AND NITROGEN OXIDES USING PETROLEUM PITCHES

[76] Inventor: Lloyd Berg, 1314 S. Third Ave., Bozeman, Mont. 59715

[21] Appl. No.: 217,315

[22] Filed: Jul. 11, 1988

[51] Int. Cl.[4] .................... C01B 21/00; C01B 17/00; B01J 8/00

[52] U.S. Cl. .................................. 423/235; 423/239; 423/243; 423/244

[58] Field of Search ............... 423/242 R, 243, 244 A, 423/244 R, 239, 239 A, 235, 235 D, 242 A

[56] References Cited

U.S. PATENT DOCUMENTS 3,726,958  4/1973  Holt et al. ............................. 423/243
4,191,732  3/1980  Uraneck et al. ..................... 423/243

*Primary Examiner*—Gregory A. Heller

[57] ABSTRACT

Sulfur dioxide and nitrogen oxides are removed from inert gases by contacting the gaseous mixture with petroleum of coal tar pitches at 400°–600° F.

5 Claims, No Drawings

REDUCTION OF SULFUR AND NITROGEN OXIDES USING PETROLEUM PITCHES

FIELD OF THE INVENTION

This invention relates to a method for reducing sulfur oxides and nitrogen oxides using asphalts or pitches.

DESCRIPTION OF THE PRIOR ART

Sulfur oxide and nitrogen oxides are evolved by industry frequently as mixtures in inert gases such as nitrogen and carbon dioxide. The separation, removal and recovery of sulfur and nitrogen oxides by present methods leaves much to be desired. The usual method is absorption with a lime slurry. The sulfur and nitrogen compounds form a thick viscous paste with the lime which is difficult to dispose of. The absorption equipment usually has frequent malfunctions which necessitates the use of duplicate equipment if the removal must be 100% of the time.

The most commonly emitted sulfur oxide is sulfur dioxide, $SO_2$. Nitrogen forms five oxides; $NO$, $NO_2$, $N_2O$, $N_2O_3$ and $N_2O_5$ and mixtures of these are frequently referred to as $NO_x$. Nitrogen dioxide, $NO_2$, is probably the most non-reactive of the five and so results obtained with this compound should be representative of what all five will do.

Berg, U.S. Pat. No. 4,687,647 reported that carbon in a liquid state, that is, in a form that can be melted, was reactive with certain sulfur compounds but that carbon in the solid form such as graphite, petroleum coke or coke from coal was non-reactive.

OBJECTIVE OF THE INVENTION

The object of this invention is to provide a method or process to remove sulfur and nitrogen oxides from mixtures with inert gases such as nitrogen, oxygen, carbon monoxide, carbon dioxide and steam. It is a further objective to identify suitable agents which are abundant and cheap and will effect the conversion at moderate temperature and pressure and high yield.

SUMMARY OF THE INVENTION

The objects of this invention are provided by a process for removing sulfur and nitrogen oxides from inert gases by reacting them with asphalt or pitch.

DETAILED DESCRIPTION OF THE INVENTION

I have discovered that when $SO_2$ or $NO_2$ admixed with inert gases such as nitrogen, is contacted with residual fuel oil, asphalt or pitch, the $SO_2$ or $NO_2$ is reduced to compounds which remain in the pitch. The temperature required is in the range of 400°–600° F. which is well above the softening point of the pitch. The molten low volatile carbonaceous material is a residual petroleum fuel oil, a petroleum asphalt a petroleum pitch, or a coal tar pitch.

TABLE 1

Table 1 shows the properties of five different asphalts and pitches investigated. These range from road asphalt, the softest, penetration 110, to petroleum pitch or coal tar pitch, less than 10.

| Name | Penetration @ 77° F., mm. | Properties of Pitches & Asphalts Kinematic Viscosity Centistokes @ 275° F. | Abs. Viscosity, poises @ 140° F. | Flash Pt. °F. |
|---|---|---|---|---|
| Road Asphalt | 110 | 280 | 1000 | |
| Straight Run Asphalt | 77 | 300 | | 450 |
| Boiler Fuel | 50–60 | 300–500 | | |
| Petroleum Pitch | <10 | | | Softening Pt., 220° F. |
| Coal Tar Pitch | <10 | Vapor Press. <1 mm Hg. | Init. B.P. >500° F. | |

USEFULNESS OF THE INVENTION

When a sulfur containing fuel is burned, the sulfur is usually converted to $SO_2$. Nitrogen compounds in the fuel come off as nitrogen oxides and heat of the high burning temperature also converts some of the nitrogen and oxygen in the air into nitrogen oxides. Reducing agents are usually relatively expensive. Some petroleum asphalts and pitches are very cheap because of their high sulfur content, a property which makes them unsuitable as a fuel source.

Another advantage of the use of asphalt or pitch is that the sulfur and nitrogen compounds are combined with the pitch which is a hard solid at ambient temperature. Disposal by means of landfill is a cheap and easy way to dispose of the recovered sulfur and nitrogen.

WORKING EXAMPLES

Example 1

The petroleum pitch listed in Table 1 was heated to 480° F. in a vertical tubular reactor. A gaseous mixture comprising 89% nitrogen, 11% $SO_2$ was bubbled through the molten pitch in the reactor from bottom to top. The off-gas was analysed by gas chromatography and gave: 94.8% nitrogen, 5.2% $SO_2$. This indicates a 45% reduction in $SO_2$ content.

Example 2

The petroleum pitch listed in Table 1 was heated to 500° F. in a vertical tubular reactor. A gaseous mixture comprising 91% nitrogen, 9% nitrogen dioxide ($NO_2$) was bubbled through the molten pitch in the reactor from bottom to top. The off-gas was analysed by gas chromatography and gave: 95% nitrogen, 5% $NO_2$. This indicates a 55% reduction in $NO_2$ content.

I claim:

1. A method for removing sulfur dioxide and nitrogen oxides from admixtures with inert gases which comprises contacting the gaseous mixture with a molten low volatile carbonaceous material selected from the group consisting of residual petroleum fuel oil, petroleum asphalt, petroleum pitch and coal tar pitch at 400°–600° F. and allowing the inert gases to exit from the carbonaceous material.

2. The method of claim 1 in which the low volatile carbonaceous material is a residual petroleum fuel oil.

3. The method of claim 1 in which the low volatile carbonaceous material is a petroleum asphalt.

4. The method of claim 1 in which the low volatile carbonaceous material is a petroleum pitch.

5. The method of claim 1 in which the low volatile carbonaceous material is a coal tar pitch.

* * * * *